(12) United States Patent
Rooney

(10) Patent No.: US 6,395,068 B1
(45) Date of Patent: May 28, 2002

(54) BULK TANK DEPRESSURIZATION FILTER APPARATUS AND METHOD OF USING IT

(76) Inventor: Dennis M. Rooney, 201 Englewood Ave., Buffalo, NY (US) 14214

( * ) Notice: Subject to any disclaimer, the term of this patent is extended or adjusted under 35 U.S.C. 154(b) by 0 days.

(21) Appl. No.: 09/678,282

(22) Filed: Sep. 30, 2000

(51) Int. Cl.[7] .............................................. B01D 53/04
(52) U.S. Cl. ............................. 95/90; 96/131; 96/153; 55/310; 55/385.4; 137/589
(58) Field of Search .................... 96/108, 121, 131, 96/153, 193; 55/310, 385.4, 385.1; 210/218; 137/899, 589; 280/838; 95/90

(56) References Cited

U.S. PATENT DOCUMENTS

| | | | |
|---|---|---|---|
| 1,784,067 A | * | 12/1930 | Holtson |
| 2,784,801 A | * | 3/1957 | Lunde |
| 5,193,709 A | * | 3/1993 | Brassell ...................... 137/587 |
| 5,503,659 A | * | 4/1996 | Crosman ..................... 96/108 |
| 5,575,832 A | * | 11/1996 | Boyd ........................... 55/524 |
| 5,824,138 A | * | 10/1998 | Taylor, III .................. 55/385.4 |
| 5,891,223 A | * | 4/1999 | Shaw et al. ................. 55/385.4 |
| 6,171,372 B1 | * | 1/2001 | Ichiki et al. .................. 96/108 |
| 6,217,639 B1 | * | 4/2001 | Jackson ...................... 55/385.4 |

* cited by examiner

Primary Examiner—David A. Simmons
Assistant Examiner—Frank M. Lawrence
(74) Attorney, Agent, or Firm—Richard D. Fuerle

(57) ABSTRACT

A bulk tank depressurization filter apparatus is disclosed which comprises a filter cartridge having an inlet and an outlet, a gas passageway therebetween, at least one gas-capturing filter through which gas in the gas passageway passes, and a Chicago coupling for attaching the inlet of the filter cartridge to a tank containing a pressurized gas. Also disclosed is a method of capturing the residual gas in a tank containing a gas under pressure using the bulk tank depressurization filter apparatus. The inlet is attached to the tank and the pressurized gas is permitted to flow from the tank into the filter cartridge where the gas is captured by the material in the filter.

20 Claims, 2 Drawing Sheets

BULK TANK DEPRESSURIZATION FILTER APPARATUS AND METHOD OF USING IT

BACKGROUND OF THE INVENTION

This invention relates to an apparatus for capturing residual gas vapors that are under pressure in a tank. In particular, it relates to an apparatus that attaches to a tank that contains a gas under pressure, so that when the gas is released into the apparatus the gas is absorbed by a filter.

Every day in the United States millions of tons of hazardous liquid or liquefied chemicals are transported in tanks on trucks, trains, ships, and airplanes. While the tanks can usually be loaded safely, the removal of chemicals from the tanks at the customer's site can be hazardous.

The chemicals can be removed from the tank by pumping them out or by forcing them out using air or nitrogen pressure. While pumping is relatively safe, the pressurization method, which is much more common, can be extremely dangerous and requires constant monitoring. The tank operator positions the bulk tank trailer in the proper unloading area, prepares the proper equipment for the delivery site, and dresses in his personal protection equipment. This equipment typically consists of rubber chemical boots, full body rubber suit, helmet with face shield, safety glasses, and a poisonous gas mask. After the operator gets dressed, he connects a hose of the proper size between the tank and the customer's chemical inlet connection. He connects an air hose from an air compressor to the air inlet assembly on the tank, opens the air inlet valve, turns on the air compressor, and pressurizes the tank to between 20 and 28 psi. It is extremely important that the air pressure does not exceed the maximum allowable pressure psi or the safety caps will explode from the tank. If this happens, the pressurized gas will eject the chemical in the tank into the atmosphere at a high velocity. When the tank has been pressurized, the operator positions himself near the unloading valves. The customer's chemical inlet valve is opened first, then the internal and external valves on the tank are opened and the chemical is forced into the customer's chemical storage tank. When the operator's tank is empty, the customer signs the proper paperwork and leaves. The driver closes all the valves and begins his clean up.

Unfortunately, there are still residual chemical vapors in the tank, typically under a pressure of about 15 to about 25 psi, which greatly exceed the pressure in the tank when it was loaded. Trucking companies typically have a policy that a truck cannot be driven with the tank under this much pressure. But under EPA regulations it is illegal for the operator to release these chemical vapors into the atmosphere. Faced with this dilemma, the operator almost always chooses to open the air inlet valve and release the vapors to the atmosphere. As he does this, he moves rapidly upwind to escape the hazardous gas cloud. Since customers' sites are frequently near residential areas, people in the area are exposed to these vapors and may suffer various ailments, some serious or even deadly, without ever knowing the cause.

SUMMARY OF THE INVENTION

I have invented an apparatus for capturing the residual gases in a pressurized tank. The apparatus of this invention prevents the release of a residual gas to the environment after a tank containing the liquified chemical and has been emptied.

The apparatus is inexpensive and can be made disposable, reusable, and recyclable. It is attached to a tank after the tank has been emptied. The operator can then drive away from the site while the residual gas gradually leaves the tank and is captured by the filter.

DESCRIPTION OF THE PREFERRED EMBODIMENTS

Figure 1:
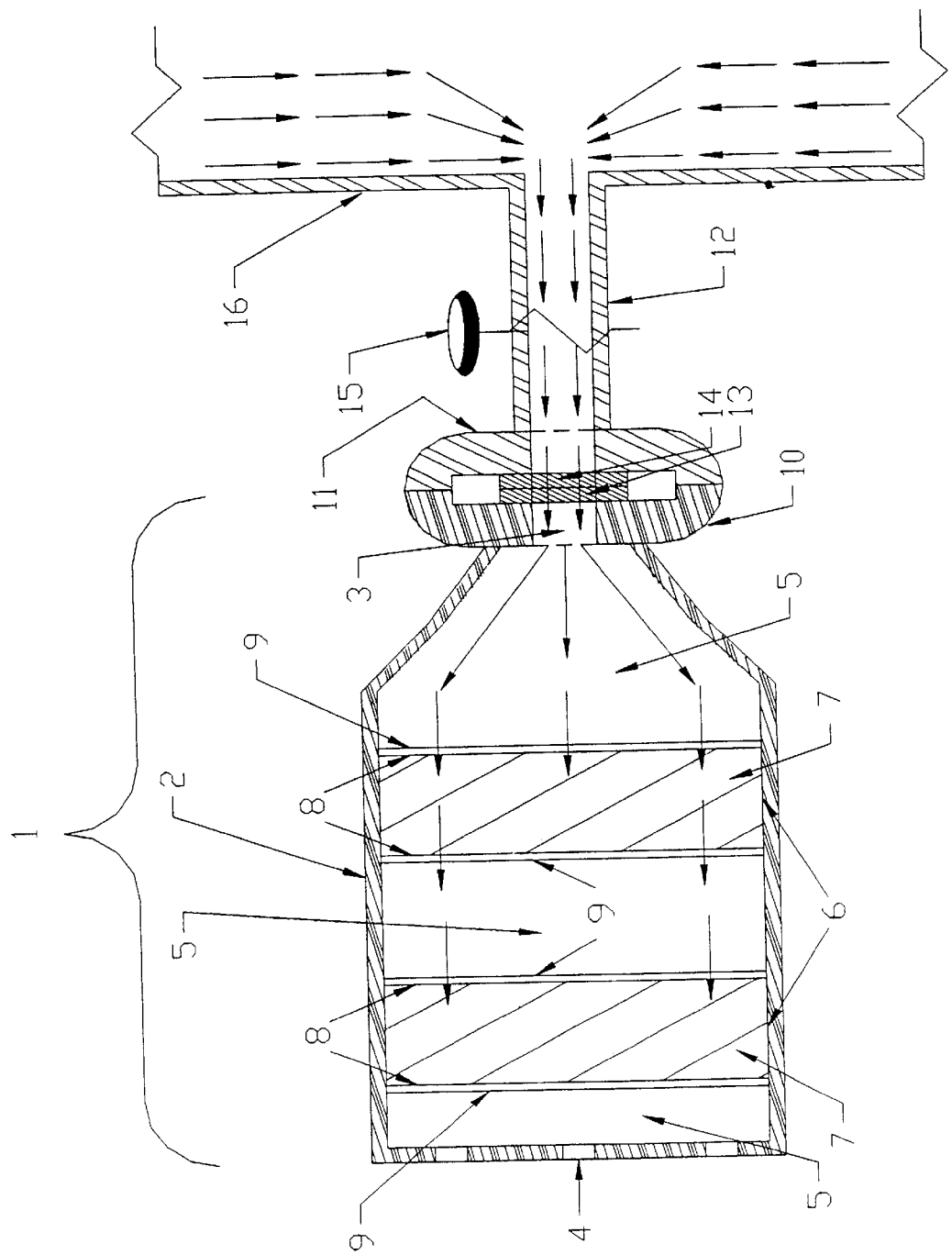
FIG. 1 is a side view partially in section showing a certain presently preferred embodiment of an apparatus according to this invention for capturing residual gases in a tank.

In the drawing, a bulk tank depressurization filter apparatus 1 has a filter cartridge 2 having an inlet 3, an outlet 4, and a gas passageway 5 between inlet 3 and outlet 4. One or more filters 6 collect gas as it moves through gas passageway 5. Filters 6 consists of a gas-capturing material 7 in a gas permeable membrane 8 and a perforated support 9 on each side to hold gas-capturing material 7 and permeable membrane 8 in place. Inlet 3 is provided with a fitting 10 which enables filter cartridge 2 to be attached to coupling 11 of conduit 12. O-ring seals 13 and 14 create a hermetic seal between filter cartridge 2 and conduit 12. A value 15 in conduit 12 controls the flow of gas under pressure out of tank 16 through conduit 12.

Figure 2:
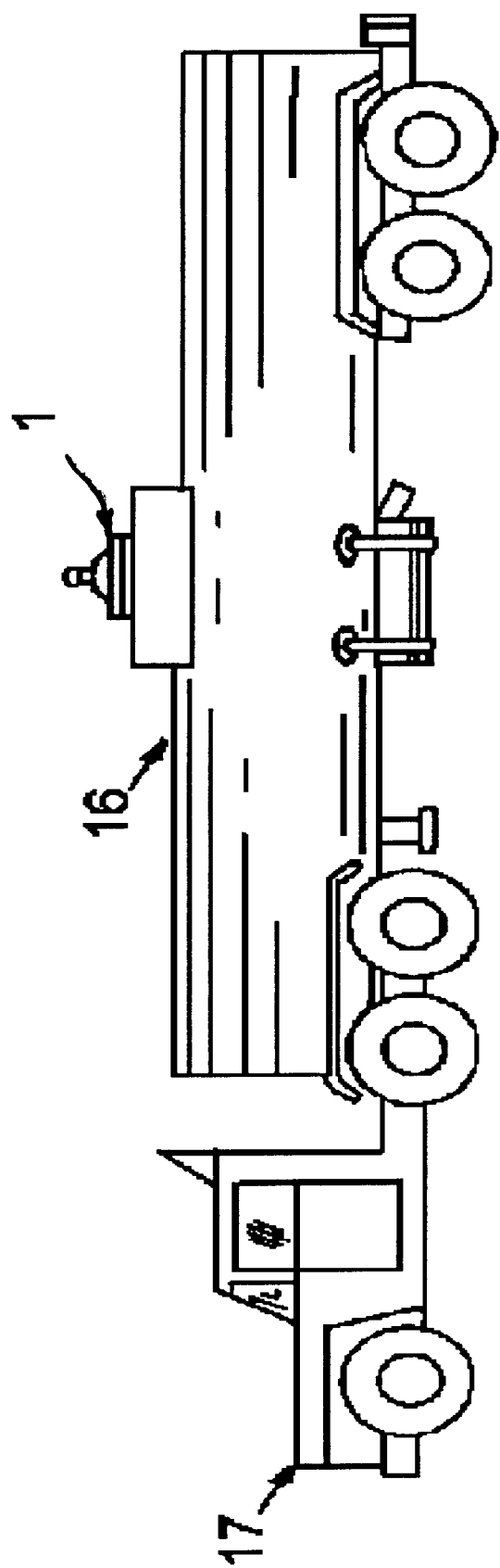
FIG. 2 is a side view showing a tank according to this invention mounted on a truck.

FIG. 2 shows a tank 16 mounted on a truck 17.

Filter cartridge 2 is preferably cylindrical, but could also have other shapes. It can be made of plastic, metal, coated cardboard, or other suitable materials; poly(vinyl chloride) (PVC) is the preferred material as it is inexpensive, rigid, and strong. Gas passageway 5 can have any dimensions, but a diameter of about 1 to 6 inches is suitable for most applications. At least one filter 6 is required, and two filters 6 are preferred, though more can be used if desired. The volume of gas-capturing material 7 is selected to be adequate to absorb all of the hazardous gas that will be emitted from tank 16. The equation of state, $PV=nRT$, can be used to calculate the amount of vapor in the tank. While the apparatus is preferably used only once and is then discarded, it can be used repeatedly by providing a larger volume of gas-capturing material 7. Filter cartridge 2 can then be provided with an sensor (not shown) to indicate when gas-capturing material 7 is nearing exhaustion.

Filters 6 are fixed to the inside of gas passageway 5, in sealed relationship therewith. The seal can be by means of O-rings, silicone sealant, or other methods, but it is preferred to mold filters 6 directly into filter cartridge 2 as this simplifies production and provides a good seal.

Any gas-capturing material 6 that will prevent the gas released from tank 16 from passing out of filter cartridge 2 through outlet 4 can be used. The particular material will depend upon the gas that is to be absorbed. For example, activated carbon or charcoal can be used for many types of gases, such as benzene, and aerosols of sodium hydroxide, hydrochloric acid, sulfuric acid, nitric acid, and acetic acid. Material 7 can be selected to react with the gas to form a solid or liquid that will remain within filter cartridge 2. For example, a base such as sodium hydroxide, calcium hydroxide, or potassium hydroxide, will react with a gaseous aerosol such as hydrogen chloride or sulfuric acid to form a solid salt. Similarly, an acidic material, such as oxalic acid, hydrochloric acid, nitric acid, or acetic acid will react with a basic gas such as ammonia to form a salt. Material 7 could also catalyze the polymerization of the gas. For example, cumyl peroxide could catalyze the polymerization of vinyl chloride monomer (VCM). As a general rule, materials such as activated carbon with an activity of 70 to 95 are good for capturing organic gases such as methylamine, chlorine, hydrogen chloride, orformaldehyde. Materials such as activated carbon impregnated with a neutralizing compound are good for capturing inorganic gases such as ammonia, hydrogen sulfide, hydrogen cyanide, or nitrogen dioxide.

Any means can be used to attach filter cartridge 2 to conduit 12. Preferably, a Chicago coupling or equivalent is used as that is a common commercial fitting in the United States, but other fittings, such as a locked clamp fitting, could also be used.

This invention is applicable to any tank 16 containing a hazardous, noxious, or poisonous gas under pressure. The tank can be on a truck, a rail car, a ship, a airplane, or fixed in position. The tank has an outlet to which the inlet of the apparatus of this invention can be attached in a sealed relationship.

To use the apparatus of this invention, tank 16 is emptied of liquid and the valve on the conduit though which the liquid left the tank is closed. The inlet 3 of filter cartridge 2 is attached to the end of conduit 12 and valve 15 is opened, permitting the gas in tank 16 to flow into filter cartridge 2, where it is captured by gas-capturing material 7. If desired, after the pressure in tank 16 has fallen, air can be forced through tank 16 to force any remaining hazardous gas in tank 16 into filter cartridge 2. When tank 16 is empty, filter cartridge 2 is detached from conduit 11. A seal can be placed over inlet 3 to prevent any condensed gas from leaving filter cartridge 2. For example, if a Chicago coupling or equivalent is used to attach filter cartridge 2 to conduit 12, a Chicago coupling cap or equivalent can be used to seal inlet 3.

I claim:

1. An assembly comprising
   (A) a tank containing a gas under pressure that can be released through a conduit said tank having a valve in said conduit;
   (B) a bulk tank depressurization filter apparatus which comprises
      (1) a filter cartridge having an inlet and an outlet and a gas passageway therebetween;
      (2) at least one gas-capturing filter in said gas passageway; and
      (3) a Chicago coupling attaching said inlet to said conduit.
2. An assembly according to claim 1 wherein said filter contains activated carbon.
3. An assembly according to claim 1 wherein said filter is molded to said filter cartridge.
4. An assembly according to claim 1 wherein said pressure is at least about 15 psi.
5. An assembly according to claim 1 wherein each filter is molded into said filter cartridge.
6. An assembly according to claim 1 wherein said filter cartridge is made of poly(vinyl chloride).
7. An assembly according to claim 1 wherein said gas is methylamine, chlorine, hydrogen chloride, or formaldehyde and said gas-capturing material is activated carbon with an activity of 70 to 95.
8. An assembly according to claim 1 wherein said gas is ammonia, hydrogen sulfide, hydrogen cyanide, or nitrogen dioxide and said gas-capturing material is activated carbon impregnated with a neutralizing compound.
9. An assembly according to claim 1 wherein said filter comprises a gas-capturing material held in a gas-permeable membrane supported by a perforated support.
10. An assembly according to claim 1 wherein said tank is on a truck.
11. A method of capturing the residual gas in a tank using a bulk tank depressurization filter apparatus according to claim 1 comprising attaching said inlet to said conduit and opening said valve to permit said gas to flow from said tank into said filter cartridge.
12. A method according to claim 11 wherein said pressure is about 15 to about 25 psi.
13. A method according to claim 11 including the additional last step of detaching said filter cartridge and sealing said inlet with a Chicago coupling cap.
14. A truck having an assembly according to claim 1 mounted thereon.
15. An assembly comprising
   (A) a tank containing a gas under a pressure of at least 15 psi, said tank having an outlet controlled by a valve in said inlet;
   (B) a bulk tank depressurization filter apparatus which comprises
      (1) a cylindrical plastic filter cartridge having an inlet and an outlet and a gas passageway therebetween;
      (2) at least one filter blocking said gas passageway, said filter comprising
         a gas-capturing material in a gas-permeable membrane held in position by a perforated support; and
      (3) a Chicago coupling attaching said inlet to the outlet of said tank.
16. An assembly according to claim 15 wherein said plastic is poly(vinyl chloride).
17. An assembly according to claim 15 wherein said gas-capturing material is activated carbon.
18. An assembly according to claim 15 wherein each filter is molded into said filter cartridge.
19. An assembly according to claim 15 wherein said filter cartridge has two filters.
20. An assembly comprising
   (A) a tank containing a gas under a pressure of at least 15 psi, said tank having an outlet controlled by a valve in said outlet;
   (B) a bulk tank depressurization filter which comprises
      (1) a cylindrical poly(vinyl chloride) filter cartridge having an inlet and an outlet and a gas passageway therebetween;
      (2) one or two gas-capturing filters blocking said gas passageway, each filter comprising activated carbon in a gas-permeable membrane held in position by a perforated support; and
      (3) a Chicago coupling attaching said inlet to the outlet of said tank.

* * * * *